(12) United States Patent
Lee (10) Patent No.: US 8,871,843 B2
(45) Date of Patent: Oct. 28, 2014

(54) HALOGEN-FREE FLAME RETARDANT MATERIAL

(75) Inventor: Jean L. Lee, San Jose, CA (US)

(73) Assignee: Apple Inc., Cupertino, CA (US)

(*) Notice: Subject to any disclaimer, the term of this patent is extended or adjusted under 35 U.S.C. 154(b) by 190 days.

(21) Appl. No.: 12/638,489

(22) Filed: Dec. 15, 2009

(65) Prior Publication Data

US 2011/0144244 A1 Jun. 16, 2011

(51) Int. Cl.

| C08K 3/28 | (2006.01) |
|---|---|
| C08K 3/22 | (2006.01) |
| C08K 3/26 | (2006.01) |
| C08K 3/34 | (2006.01) |
| C08K 3/38 | (2006.01) |
| C08K 5/05 | (2006.01) |
| C08K 5/1535 | (2006.01) |
| C08K 5/1545 | (2006.01) |
| C08K 5/17 | (2006.01) |
| C08K 5/45 | (2006.01) |
| C08L 23/06 | (2006.01) |
| C08K 3/00 | (2006.01) |
| C08L 23/02 | (2006.01) |
| C08L 53/00 | (2006.01) |

(52) U.S. Cl.
CPC .............. C08K 3/0058 (2013.01); C08L 23/06 (2013.01); C08L 53/00 (2013.01); C08L 23/02 (2013.01); C08K 3/34 (2013.01)
USPC ............................ 524/186; 524/429; 524/492

(58) Field of Classification Search
USPC .......................................... 524/186, 429, 492
See application file for complete search history.

(56) References Cited

U.S. PATENT DOCUMENTS

| 4,869,848 A | 9/1989 | Hasegawa et al. |
|---|---|---|
| 4,879,332 A | 11/1989 | Saito et al. |
| 4,996,255 A | 2/1991 | Davis et al. |
| 5,286,775 A | 2/1994 | Bandyopadhyay |
| 5,456,984 A | 10/1995 | Bishop et al. |
| 5,484,830 A | 1/1996 | Staendeke |
| 5,648,436 A | 7/1997 | Janowitz et al. |
| 5,925,700 A | 7/1999 | Imahashi |
| 5,955,184 A | 9/1999 | Honda et al. |
| 5,994,429 A | 11/1999 | Honda et al. |
| 6,140,411 A | 10/2000 | Schwanborn et al. |
| 6,355,767 B1 * | 3/2002 | Takagi ........................ 528/196 |
| 6,440,567 B1 | 8/2002 | Choate et al. |
| 6,495,244 B1 | 12/2002 | Andresakis et al. |
| 6,518,336 B1 | 2/2003 | Yabuhara et al. |
| 6,642,288 B1 | 11/2003 | Hulskotte |
| 6,755,995 B1 | 6/2004 | Hasegawa et al. |
| 6,767,941 B2 | 7/2004 | Van Der Spek et al. |
| 6,809,130 B2 | 10/2004 | Chiou et al. |
| 6,894,101 B2 | 5/2005 | Paul et al. |
| 6,916,539 B2 | 7/2005 | Cooray et al. |
| 6,998,536 B2 | 2/2006 | Barusseau et al. |
| 7,053,145 B1 | 5/2006 | Tasaka et al. |
| 7,115,678 B2 | 10/2006 | Ihara et al. |
| 7,279,520 B2 | 10/2007 | Hausmann et al. |
| 7,323,504 B2 | 1/2008 | Steenbakkers-Menting et al. |
| 7,368,495 B2 | 5/2008 | Ihara et al. |
| 7,456,235 B2 | 11/2008 | Heschke et al. |
| 7,495,174 B2 | 2/2009 | Hase et al. |
| 7,939,591 B2 * | 5/2011 | Tomoda ........................ 524/284 |
| 2001/0016615 A1 * | 8/2001 | Sobkin et al. .................. 524/91 |
| 2002/0155348 A1 | 10/2002 | Gitto |
| 2005/0080165 A1 * | 4/2005 | Gabriel ........................ 523/220 |
| 2006/0245607 A1 | 11/2006 | Kynnos |
| 2009/0151984 A1 | 6/2009 | Fujimura |

FOREIGN PATENT DOCUMENTS

WO WO 2006123833 A1 * 11/2006

* cited by examiner

*Primary Examiner* — Angela C Scott
(74) *Attorney, Agent, or Firm* — Brownstein Hyatt Farber Schreck, LLP (57) ABSTRACT

The disclosure describes halogen free flame retardant resin compositions comprising at least one thermoplastic polymer; an inorganic filler; and a flame retardant additive, wherein the flame retardant additive is an alkali metal nitrite; an alkaline earth metal nitrite; an alkali metal nitride; an alkaline earth metal nitride; an alkali metal borate; an alkaline earth metal borate; an alkali metal silicide; an alkaline earth metal silicide; an alkali metal silicate; or an alkaline earth metal silicate. Also described are computing systems having components formed of such a halogen free, flame retardant resin.

11 Claims, 1 Drawing Sheet

HALOGEN-FREE FLAME RETARDANT MATERIAL

BACKGROUND

It has been estimated that about 10% of fires are caused by electrical faults of wiring and electrical equipment, and that these fires account for 19% of fire-related injuries. Some plastics are inherently resistant to fire, such as polyvinylchloride (PVC). However, PVC is not suitable for many electronics applications. Only about 12% of plastics used today contain flame retardants. An increased use of flame retardants would improve the safety of electrical wiring and electronic devices, and therefore reduce the number of fires caused by electronic devices.

Halogenated flame retardants have been found to be effective in many plastics. However, environmental and health concerns have caused halogenated flame retardants to be less desirable for electronic devices, and they are being increasingly regulated.

A wide variety of flame retardant resin compositions have been developed to ensuring safety against fire, including halogen free flame retardant resin compositions. Generally, halogen free flame resisting resin compositions contain inorganic fillers, such as aluminum hydroxide or magnesium hydroxide. The amount of the inorganic filler required to obtain sufficiently high flame resisting effect is generally 30 to 70% by weight based of the composition. However, a synthetic resin composition containing such high contents of inorganic filler generally do not exhibit suitable physical characteristics, such as well-balanced strength, resulting in brittle products with poor processability. Accordingly, there is a need for new halogen-free flame retardants, as well as new halogen-free plastics and resin materials.

SUMMARY

The invention provides halogen-free flame retardants, resins that include halogen free flame retardants, and plastic components made from such materials. In some embodiments, the invention relates to a composite resin molded article having excellent flame retardancy, electric insulation properties, and crack resistance, and produces only negligible amounts of toxic substances during incineration, if any at all.

Accordingly, the invention provides a halogen free resin composition that includes at least one thermoplastic polymer; an inorganic filler; and a flame retardant additive, wherein the flame retardant additive comprises an alkali metal nitrite; an alkaline earth metal nitrite; an alkali metal nitride; an alkaline earth metal nitride; an alkali metal borate; an alkaline earth metal borate; an alkali metal silicide; an alkaline earth metal silicide; an alkali metal silicate; an alkaline earth metal silicate; or a combination thereof.

The thermoplastic polymer can include one or more of polyethylene (PE); ethylene-vinyl acetate copolymer (EVA); ethylene-ethyl acrylate copolymer (EEA); ethylene-methyl methacrylate copolymer (EMMA); polypropylene (PP); polystyrene (PS); polyacrylonitrile; acrylonitrile-butadiene-styrene copolymer (ABS); nylon-6; nylon-6,6; polycarbonate (PC); polyurethane; biaxially-oriented polyethylene terephthalate (boPET) polyester; ethylene-α-olefin copolymer; ethylene-vinyl ester copolymers; ethylene-α,β-unsaturated carboxylic acid alkyl ester copolymers; poly(acrylic acid); or polyphenylene sulphone (PPS). The thermoplastic polymer can be present, for example, in about 30 wt. % to about 70 wt. % of the composition.

The inorganic filler can be one or more of carbon black, white carbon, silica, zirconium silicate, alumina, hydrated alumina, aluminum trihydrate, hydrated magnesium, barium sulfate, barium titanate, titanium oxide, magnesium oxide, molybdenum oxide, tin oxide, zinc oxide, talc, mica, glass beads, hollow glass balls, clay, silicone oil, quartz, barium carbonate, calcium carbonate, or magnesium carbonate. In some embodiments, one or more of such inorganic fillers can also be excluded from the composition. The inorganic filler can be present, for example, in about 1 wt. % to about 30 wt. % of the composition.

In some embodiments, the flame retardant additive can include an alkali metal nitrite or an alkaline earth metal nitrite. The alkali metal nitrite or alkaline earth metal nitrite can be, for example, lithium nitrite, sodium nitrite, potassium nitrite, magnesium nitrite, or calcium nitrite.

In some embodiments, the flame retardant additive can include an alkali metal nitride or an alkaline earth metal nitride. The alkali metal nitride or alkaline earth metal nitride can be, for example, lithium nitride, magnesium nitride, beryllium nitride, or calcium nitride.

In some embodiments, the flame retardant additive can include an alkali metal borate or an alkaline earth metal borate. The alkali metal borate or alkaline earth metal borate can be, for example, sodium metaborate, sodium tetraborate, $NaB_{14.5}$, $Na_2B_{29}$, $NaB_{15}$, calcium aluminum triborate (johachidolite), magnesium diboride, suanite; johachidolite; $Li_6B_4O_9$; $LiBO_2$; $CaB_2O_4$; sodium metaborate; sodium tetraborate; $Na_2[B_4O_5(OH)_4] \cdot 8H_2O$, or disodium octaborate tetrahydrate.

In some embodiments, the flame retardant additive can include an alkali metal silicide or an alkaline earth metal silicide. The alkali metal silicide or alkaline earth metal silicide can be, for example, sodium silicide, potassium silicide, rubidium silicide, cesium silicide magnesium silicide, or calcium silicide.

In some embodiments, the flame retardant additive can include an alkali metal silicate or an alkaline earth metal silicate. The alkali metal silicate or alkaline earth metal silicate can be, for example, thaumasite, olivine; or epidote.

Any given embodiment can also include an antioxidant, such as an amino acid, vitamin A, vitamin E, ascorbic acid, or lipoic acid. Antioxidants can be included in about 0.5 parts to 15 parts by weight, or in about any 0.5 part increment within such a range. In some embodiments, the composition can have a melt index of, for example, about 0.1 g/10 minutes to about 10.0 g/10 minutes.

In some embodiments, a halogen free resin composition includes about 70 parts to 30 parts by weight of at least one thermoplastic polymer; about 30 parts to 70 parts by weight of an inorganic filler; and about 0.5 parts to 15 parts by weight of a flame retardant additive, wherein the flame retardant additive includes an alkali metal nitrite; an alkaline earth metal nitrite; an alkali metal nitride; an alkaline earth metal nitride; an alkali metal borate; an alkaline earth metal borate; an alkali metal silicide; an alkaline earth metal silicide; an alkali metal silicate; an alkaline earth metal silicate; or a combination thereof.

The invention further provides a computing system, input device, or computer component comprising any of the compositions described above or herein. For example, a computing system can include at least one component selected from the group consisting essentially of, a housing, an input device, and a cable, wherein the component includes a halogen free resin, that includes at least one thermoplastic polymer; an inorganic filler; and a flame retardant additive, wherein the flame retardant additive comprises an alkali metal nitrite; an alkaline earth metal nitrite; an alkali metal nitride; an alkaline earth metal nitride; an alkali metal borate; an alkaline earth metal borate; an alkali metal silicide; an alkaline earth metal silicide; an alkali metal silicate; an alkaline earth metal silicate; or a combination thereof.

In some embodiments, a flame retardant resin is provided that does not include carbon black. The resins are therefore widely applicable to the fields where colored products are desirable, such as products where appearance has commercial significance. Examples of such products include personal electronic devices, such as personal computers, laptop computers, cell phones, personal digital assistants, electronic games, and the like.

The invention also relates to a self-fire extinguishable, halogen-free and flame resisting synthetic resin composition. Such a composition can be obtained by adding 0.5 to 15 parts by weight of a flame retardant additive as described herein to a mixture comprising 70 to 30 parts by weight of a thermoplastic synthetic resin and 30 to 70 parts by weight of an inorganic filler, such as magnesium hydroxide or aluminum hydroxide having an average particle size of 0.1 to 10 μm.

The flame retardant materials can be effective flame retardants in standard and technical plastics, thermosets, textiles, and rubbers. The invention also provides a prepreg impregnated with the halogen-free flame-retardant epoxy resin composition according to the invention as well as a laminate, copper-clad laminate and printed wiring board prepared by using the prepreg.

BRIEF DESCRIPTION OF THE DRAWINGS

The following drawing forms part of the specification and is included to further demonstrate certain embodiments or various aspects of the invention. In some instances, embodiments of the invention can be best understood by referring to the accompanying drawing in combination with the detailed description presented herein. The description and accompanying drawing may highlight a certain specific example, or a certain aspect of the invention, however, one skilled in the art will understand that portions of the example or aspect may be used in combination with other examples or aspects of the invention.

DETAILED DESCRIPTION

Definitions

As used herein, certain terms have the following meanings. All other terms and phrases used in this specification have their ordinary meanings as one of skill in the art would understand. Such ordinary meanings may be obtained by reference to technical dictionaries, such as *Hawley's Condensed Chemical Dictionary* 14$^{th}$ Edition, by R. J. Lewis, John Wiley & Sons, New York, N.Y., 2001.

References in the specification to "one embodiment", "an embodiment", "an example embodiment", etc., indicate that the embodiment described may include a particular aspect, feature, structure, moiety, or characteristic, but not every embodiment necessarily includes that aspect, feature, structure, moiety, or characteristic. Moreover, such phrases may, but do not necessarily, refer to the same embodiment referred to in other portions of the specification. Further, when a particular aspect, feature, structure, moiety, or characteristic is described in connection with an embodiment, it is within the knowledge of one skilled in the art to affect such aspect, feature, structure, moiety, or characteristic in connection with other embodiments, whether or not explicitly described.

The term "and/or" means any one of the items, any combination of the items, or all of the items with which this term is associated.

The singular forms "a," "an," and "the" include plural reference unless the context clearly dictates otherwise. Thus, for example, a reference to "a compound" includes a plurality of such compounds, so that a compound X includes a plurality of compounds X. It is further noted that the claims may be drafted to exclude any optional element. As such, this statement is intended to serve as antecedent basis for use of such exclusive terminology as "solely," "only," and the like in connection with the recitation of claim elements, or use of a "negative" limitation.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer. Unless indicated otherwise herein, the term "about" is intended to include values, e.g., weight percents, proximate to the recited range that are equivalent in terms of the functionality of the individual ingredient, the composition, or the embodiment.

As will be understood by one skilled in the art, for any and all purposes, particularly in terms of providing a written description, all ranges disclosed herein also encompass any and all possible subranges and combinations of subranges thereof as well as the individual values making up the range, particularly integer values. A recited range (e.g., weight percents or carbon groups) includes each specific value, integer, decimal, or identity within the range. Any listed range can be easily recognized as sufficiently describing and enabling the same range being broken down into at least equal halves, thirds, quarters, fifths, tenths, etc. As a non limiting example, each range discussed herein can be readily broken down into a lower third, middle third and upper third, etc. As will also be understood by one skilled in the art, all language such as "up to," "at least," "greater than," "less than," "more than," "or more" and the like include the number recited and refer to ranges which can be subsequently broken down into subranges as discussed above. In the same manner, all ratios disclosed herein also include all subratios falling within the broader ratio.

One skilled in the art will also readily recognize that where members are grouped together in a common manner, such as in a Markush group, the invention encompasses not only the entire group listed as a whole, but each member of the group individually and all possible subgroups of the main group. Additionally, for all purposes, the invention encompasses not only the main group, but also the main group absent one or more of the group members. The invention also envisages the explicit exclusion of one or more of any of the group members in the claimed invention.

As will be understood by the skilled artisan, all numbers, including those expressing quantities of ingredients, properties such as molecular weight, reaction conditions, and so forth, are approximations and understood as being modified in all instances by the term "about." These values can vary depending upon the desired properties sought to be obtained by those skilled in the art utilizing the teachings of the invention. It is also understood that such values inherently contain variability necessarily resulting from the standard deviations found in their respective testing measurements.

The phrase "one or more" is readily understood by one of skill in the art, particularly when read in context of its usage. For example, one or more substituents on a phenyl ring refers to one to five, or one to up to four, for example if the phenyl ring is disubstituted.

The term "contacting" refers to the act of touching, making contact, or of bringing to immediate or close proximity, including at the molecular level, for example, to bring about a chemical reaction, or a physical change, e.g., on the surface of a solid or in the gas phase near the surface of a solid.

Specific values listed below for radicals, substituents, and ranges, are for illustration only; they do not exclude other defined values or other values within defined ranges for radicals and substituents.

The term "halogen free" refers to a composition that includes less than 900 parts per million of halogen content, including, for example, the cumulative mass of chlorine-containing and bromine-containing components (i.e., the mass of the chlorine-containing and bromine-containing components added to the resin formulation).

Description of the Halogen Free Flame Retardant Compositions.

As consumer electronics manufacturers phase out the use of brominated and chlorinated flame retardant materials due to environmental concerns, alternate materials must be developed to fill the void. The compositions described herein provide halogen-free (HF) flame retardant materials by introducing alkali or alkaline earth metal nitrites, nitrides, borides, and/or silicates into materials, such as cross-linked polyethylene (often used for electrical cable jackets and the like). The HF flame retardant materials can suppress combustion by scavenging free radicals released during combustion that help propagate burning, or by forming a protective non-flammable coating on a material. HF flame retardant materials have wide-spread applications, and provide environmentally-friendly products.

Typically, flame retardants work by preventing the release of flammable gases from a material when heat is applied. This disclosure provides retardants directed at neutralizing high energy ions in a flame that can otherwise decompose molecules in the material that further sustain flame, materials additives that, when exposed to heat, form a layer on top of the material that hinders the release of flammable gases from the material and shields the material from the flame, and material additives that release water or non-flammable gases upon exposure to heat.

Accordingly, the disclosure provides halogen free flame retardant resins that include a flame retardant material additive. The flame retardant additives can be one or more of:

an alkali or alkaline earth nitride;
an alkali or alkaline earth nitrite;
an alkali or alkaline earth borate;
an alkali or alkaline earth silicide;
an alkali and alkaline earth silicate;
an antioxidant compound, such as amino acids (e.g., glutathione), polyphenols, carotenoids, tocotrienols, ascorbic acid, and/or lipoic acid; or salts thereof;
or a combination thereof.

The flame retardant additives can be added to a resin to scavenge high energy ions that may be released by a burning resin. The flame retardant resins can be used to provide flame proof or flame resistant apparatuses constructed of a halogen-free flame retardant material as described herein.

Flame Retardant Activity. Solid materials do not burn directly. They first decompose by heat (e.g., pyrolysis) to release flammable gases. Visible flames appear when these flammable gases react with oxygen ($O_2$) in the air. If solid materials do not break down into gases, they merely smolder and often self extinguish. An example of self extinguishing is when a solid chars and forms a stable carbonaceous barrier that prevents access of a flame to the underlying material. However, once flammable gases from a solid ignite, the heat generated can often break down long-chain solid molecules (e.g., polymer chains) into smaller molecules that transpire as gases, fueling the fire. The gas flame itself is maintained by the action of high energy radicals (H. and OH. in the gas phase), which decompose nearby molecules to produce free carbon, which then reacts with oxygen in the air to burn, generating additional heat energy.

Flame retardants work by preventing the release of flammable gases from a material when an amount of heat capable of igniting the material is applied. Depending on the specific molecule that is decomposed by high energy ions, flammable gases such as $O_2$ are often released, further sustaining a flame. Flame retardants act by effectively removing the H. and OH. radicals in the gas flame phase. This action considerably slows or prevents the burning process, thus reducing heat generation and the production of further gaseous flammable material.

Char Formation. The flame retardant compositions described herein can act efficiently in the solid phase of burning materials. When heated, the flame retardants can react to produce high energy radical quenching agents, such as low energy radicals or acids. The low energy radicals or acids can cause the solid material to further polymerize and/or char, forming a glassy layer, thereby inhibiting the pyrolysis process that could feed any flames.

By this mode of action the amount of fuel produced is significantly diminished, because char rather than combustible gas is formed. The resulting intumescent char layer plays significant roles in the flame retardant process. It acts as a two-way barrier, both hindering the passage of the combustible gases and molten polymer toward the flame, and shielding the polymer from the heat of the flame. The amount of fuel available for the fire is also significantly diminished, because char, rather than combustible gas, is formed.

Flame Retardant Compositions. The flame retardant resin compositions described herein can prevent the release of flammable gases from a material, or reduce their energy, by a variety of mechanisms. The flame retardant additive in the resin composition can neutralize high energy ions (e.g., $H^+$) found in a flame, which can otherwise decompose molecules in the material into flammable gasses. The flame retardant additive, when exposed to heat, can also form a layer on top of a solid material that hinders the release of flammable gases from the material and shields the material from the flame. The flame retardant additive can also release water or non-flammable gases upon exposure to heat. The flame retardant additive can promote cross-linking in polymers, thereby rendering the polymer less susceptible to decomposition, it can absorb excess heat from combustible gases. The flame retardants described herein can act singly or in combination.

Synthetic Resins of the Flame Retardant Compositions.

Any suitable polymer or resin can be used to prepare the compositions and apparatuses described herein. The resins used in the flame retardant compositions can include thermoplastic or thermoset polymers, and/or copolymers thereof. Typical synthetic resins used are thermoplastic resins. Examples include crystalline polyolefins such as polyethylene (PE), such as low-density polyethylene (LDPE), very low density polyethylene (VLDPE), linear low-density polyethylene (LLDPE), or high-density polyethylene (HDPE); ethylene-vinyl acetate copolymer (EVA); ethylene-ethyl acrylate copolymer (EEA); ethylene-methyl methacrylate copolymer (EMMA); polypropylene (PP); polystyrene (PS); polyacrylonitrile; acrylonitrile-butadiene-styrene copolymer (ABS); nylon-6; and nylon-6,6. Other examples include polycarbonate (PC), polyurethane, biaxially-oriented polyethylene terephthalate (boPET) polyester (e.g., Mylar® polyester), ethylene-α-olefin copolymer, ethylene-vinyl ester copolymers, ethylene-α,β-unsaturated carboxylic acid alkyl ester copolymers, poly(acrylic acid), and polyphenylene sulphone (PPS). Of course, combinations of such polymers can also be employed.

The halogen-free flame retardant material can be blended into any resin-containing component, for example, components used for computers, cellular phones, personal digital assistants, and the like. The material is especially useful for use in components that reside near a heat source, such as board materials and enclosures, for example, the casing of a personal or laptop computer. In some embodiments, the resin composition has a melt flow index (ASTM D-1238) of 0.2 to 30 g/10 min, or 0.5 to 20 g/10 min. The strength of the resulting composition can be enhanced in some embodiments by employing a resin that has a melt index of about 0.2 to about 10.0 g/10 min.

In one embodiment, a single olefin resin, a combination of two or more kinds of olefin resins, or a combination of an olefin resin as a major ingredient and one or two or more kinds of rubbers can be used for the resin composition. When being used in combination, the olefin resin and rubber may be combined prior to addition of a flame retardant additive, or the flame retardant additive can be combined with major ingredient, followed by addition of the minor component resin or rubber.

The types of rubber used can include ethylene-propylene-based rubbers, butadiene-based rubbers, isoprene-based rubbers, natural rubbers, nitrile rubbers, isobutylene rubbers, and the like. Ethylene-propylene-based rubbers include random copolymers mainly composed of ethylene and propylene, or random copolymers mainly composed of ethylene, propylene, and a diene monomer as the third component, such as dicyclopentadiene or ethylidene norbornene, and the like.

Butadiene-based rubbers are typically copolymers comprising butadiene as the major ingredient, which include styrene-butadiene block copolymers and hydrogenated or partially hydrogenated derivatives thereof, such as styrene-ethylene-butadiene-styrene copolymers, 1,2-polybutadiene, maleic anhydride-modified styrene-ethylene-butadiene-styrene copolymers, modified butadiene rubbers having a core-shell structure, and the like.

Isoprene-based rubbers are typically copolymers comprising isoprene as the major ingredient, which include styrene-isoprene block copolymers and hydrogenated or partially hydrogenated derivatives thereof, such as styrene-ethylene-isoprene-styrene copolymers, maleic anhydride-modified styrene-ethylene-isoprene-styrene copolymers, modified isoprene rubbers having a core-shell structure, and the like.

In some embodiments, the polymer component or components of the flame retardant resin compositions described herein can have molecular weights of greater than about 4500. For example, one or more of the polymer components can have a weight average molecular weight of 10,000 to 250,000. The polymers may optionally contain 5 to 60 mol % of carboxyl groups or carboxylic anhydride groups. The polymer component or components can include an epoxy resin, a maleimide resin, an acrylic resin, a methacrylic resin, a diallylphthalate resin, a triazine resin, an alicyclic olefin polymer, an aromatic polyether polymer, a benzocyclobutene polymer, a cyanate ester polymer, and a polyimide resin can be given. These polymers may be used either alone or in combinations of two or more.

In some embodiments, the weight average molecular weight (Mw) of a polymer can be about 10,000 to 250,000, or about 15,000 to 150,000, or about 20,000 to 100,000. The weight-average molecular weight of a block copolymers used, such as (hydrogenated) block copolymer, can also be about 5,000 to about 1,500,000, or about 10,000 to about 550,000, or about 100,000 to about 550,000, or about 100,000 to about 400,000. The molecular weight distribution (the ratio (Mw/Mn) of the weight-average molecular weight (Mw) to the number-average molecular weight (Mn)) can be about 10 or less, or about 5 or less, or about 2 or less. The Mw of the polymer can be measured by gel permeation chromatography (GPC) and determined as a polystyrene-reduced value.

The HF flame retardant resin composition can be an adhesive resin composition, which may include a combination of two or more resin compounds having the same or differing molecular weights and degrees of functionality. Two or more resins, having the same or different functionality and molecular weights can be advantageously combined in a formulation that results in a cured resin having a high Tg, and low Dk.

The resins used in adhesive resin compositions can be heat activated and the adhesive resin compositions can have a viscosity range from about 900 to 2000 centipoise, or about 1200 to about 1700 centipoise. The viscosity can be modified by altering the solids content or the resin ingredients used in the adhesive resin composition.

Examples of other useful resin components include bistriazine resins, phenoxy resins, bis-phenol epoxy resins, phenolic novolac resins, epoxidized phenolic novolac resins, urethane resins, polyvinyl acetate resins, and any other resins that can be useful in adhesive resin compositions. Further examples of useful resin and resin ingredients are described in U.S. Pat. Nos. 5,674,611; 5,629,098; and 5,874,009, which are incorporated herein by reference.

The resin compositions typically will include about 1 wt. % to 40 wt. %, or about 5 wt. % to 30 wt. %, of a halogen-free flame retardant additive and from about 60 wt. % to 95 wt. % of one or more resin compounds. The adhesive resin compositions can also include about 10 wt. % to about 20 wt. % of one or more halogen-free flame retardant additives, or about 12 wt. % to about 17 wt. % of a halogen-free flame retardant additive, with the remainder being one or more resin compounds.

The mechanical and electrical properties of the resin compositions upon cure can be substantially controlled by choice of the molecular weight of ingredients used in the resin composition. When certain oxygen containing resins are used, for example, a phenoxy resin, the molecular weight can be about 8,000 to about 60,000, for example, about 20,000.

The resin compositions may include other ingredients and additives known to those of ordinary skill in the art to be useful in a resin composition, for example, adhesive resin compositions. The resin compositions can be particularly useful in preparing resin coated conductive foils, cores, and other substrates and laminates, for example, those used in the manufacture of printed circuit boards. The resin compositions can be used in the manufacture of resin coated conductive foils and, in particular, resin coated copper foils. Resin coated copper foils can be manufactured by applying a layer of resin to one surface of a two surface conductive foil. The thickness of resin applied to the foil surface produces a cured resin thickness of about 20 to about 100 microns. The resin can also be applied in a layer having a cured thickness of about 20 to about 50 microns. After coating with an adhesive resin, the resin coated copper can be partially cured or b-staged. A second layer of resin may be applied to the surface of the b-staged resin layer. If a second layer of resin is applied, the second layer of resin can be b-staged during which time the first layer typically becomes essentially fully cured. The final product can be, for example, an adhesive resin coated conductive coated metal foil that is useful in standard printed circuit board manufacturing techniques.

In one embodiment, the HF flame retardant resin composition includes a resin composition that includes a thermoplastic resin that includes (a) a block copolymer made up of at least two polymer blocks that include a vinyl aromatic compound and at least one polymer block that includes a conjugated diene compound and/or a hydrogenated block copolymer obtained by hydrogenating the block copolymer; a nonaromatic-series softening agent for rubber; an ethylene-α-olefin copolymer; a polypropylene resin; and one or more flame retardant additives described below.

Curing Agents. The resin of the flame retardant composition can include a curing agent, for example, during preparation. In a resin that is to be crosslinked, the curing agent is not particularly limited insofar as the curing agent can crosslink the resin by heating, irradiation, or other initiative process. In some embodiments, the curing agent is a compound that can form a crosslinking structure by reacting with carboxyl groups of a resin.

Examples of curing agents include a polyepoxy compound, a compound having two or more isocyanate groups, a polyamine compound, a compound having two or more hydrazide groups, an aziridine compound, a basic metal oxide, an organic metal halide, and the like. These curing agents may be used either individually or in combinations of two or more. A peroxide such as dicumyl peroxide, octanoyl peroxide, m-chloroperbenzoic acid, or peracetic acid can also be used as a curing agent.

Examples of polyepoxy compounds include compounds having two or more epoxy groups in a molecule, for example, glycidyl ether epoxy compounds such as a phenol novolak epoxy compound, a cresol novolak epoxy compound, a cresol epoxy compound, a bisphenol A epoxy compound, a bisphenol F epoxy compound, a brominated bisphenol A epoxy compound, a brominated bisphenol F epoxy compound, and a hydrogenated bisphenol A epoxy compound; and polyvalent epoxy compounds such as an alicyclic epoxy compound, a glycidyl ester epoxy compound, a glycidyl amine epoxy compound, and an isocyanurate epoxy compound.

Examples of compounds having two or more isocyanate groups include diisocyanates and triisocyanates having 6 to 24 carbon atoms. Examples of the diisocyanates include 2,4-tolylene-diisocyanate, 2,6-tolylenediisocyanate, 4,4'-diphenylmethanediisocyanate, hexamethylene-diisocyanate, and p-phenylenediisocyanate. Examples of the triisocyanates include 1,3,6-hexamethylenetriisocyanate, 1,6,11-undecanetriisocyanate, and bicycloheptanetriisocyanate.

Examples of polyamine compounds include aliphatic polyamine compounds having 4 to 30 carbon atoms and two or more amino groups, aromatic polyamine compounds having two or more amino groups, and the like. In some embodiments, compounds having a non-conjugated nitrogen-carbon double bond such as a guanidine compound can be excluded.

Examples of aliphatic polyamine compounds include hexamethylenediamine and N,N'-dicinnamilidene-1,6-hexanediamine.

Examples of aromatic polyamine compounds include 4,4'-methylenedianiline, m-phenylenediamine, 4,4'-diamino diphenyl ether, 4'-(m-phenylenediisopropylidene)dianiline, 4,4'-(p-phenylenediisopropylidene)dianiline, 2,2'-bis[4-(4-aminophenoxy)phenyl]propane, and 1,3,5-benzenetriamine.

Examples of compounds having two or more hydrazide groups include isophthalic acid dihydrazide, terephthalic acid dihydrazide, 2,6-naphthalenedicarboxylic acid dihydrazide, maleic acid dihydrazide, itaconic acid dihydrazide, trimellitic acid dihydrazide, 1,3,5-benzenetri-carboxylic acid dihydrazide, and pyromellitic acid dihydrazide.

Examples of aziridine compounds include tris-2,4,6-(1-aziridinyl)-1,3,5-triazine, tris[1-(2-methyl)aziridinyl]phosphinoxide, and hexa[1-(2-methyl)aziridinyl]triphosphatriazine.

Examples of the peroxide include known organic peroxides such as ketone peroxide, peroxyketal, hydroperoxide, diallylperoxide, diacylperoxide, peroxy ester, and peroxy dicarbonate.

Polyepoxy compounds, particularly bisphenol A epoxy compounds, such as bisphenol A bis(propylene glycol glycidyl ether) ether, are desirable various due to their moderate reactivity with numerous resins and their capability of producing composite resin molded articles that can be easily melted, processed, and laminated.

The amount of curing agent used can be about 1 to about 100 parts by weight, or about 5 to about 80 parts by weight, for example, about 10 to about 50 parts by weight, for 100 parts by weight of the total amount of resin used in the HF flame retardant resin composition.

Curing Accelerators. A curable resin composition can further include a curing accelerator. A curing accelerator can facilitate obtaining a cured product having heat resistance. For example, when a polyepoxy compound is used as the curing agent, a curing accelerator such as a tertiary amine compound or a trifluoroboron complex can be suitably used. A tertiary amine compound is advantageous to certain embodiments due to its ability to promote compositions having significant heat resistance and chemical resistance. Examples of tertiary amine compounds include chain-like tertiary amine compounds such as benzylmethylamine, triethanolamine, triethylamine, tributylamine, tribenzylamine, and dimethylformamide; nitrogen-containing heterocyclic compounds such as pyrazoles, pyridines, pyrazines, pyrimidines, indazoles, quinolines, isoquinolines, imidazoles, and triazoles.

Examples of the substituted imidazole compound include alkyl-substituted imidazole compounds such as 2-ethylimidazole, 2-ethyl-4-methylimidazole, bis-2-ethyl-4-methylimidazole, 1-methyl-2-ethylimidazole, 2-isopropyl imidazole, 2,4-dimethylimidazole, and 2-heptadecylimidazole; and imidazole compounds substituted with a hydrocarbon group having a cyclic structure such as an aryl group or an aralkyl group, such as 2-phenylimidazole, 1-benzyl-2-methylimidazole, 1-benzyl-2-ethylimidazole, benzimidazole, 2-ethyl-4-methyl-1-(2'-cyanoethyl)imidazole, 2-ethyl-4-methyl-1-[2'-(3",5"-diaminotriazinyl)ethyl]imidazole, and 1-benzyl-2-phenylimidazole. These curing accelerators may be used either individually or in combination of two or more.

The amount of curing accelerator can be determined according to the needs of the application. Amounts typically are about 0.001 to 30 parts by weight, about 0.01 to 10 parts by weight, or about 0.03 to 5 parts by weight, for 100 parts by weight of the total amount of resin in the composition.

Fillers. The resin composition can include one or more fillers. Fillers can provide the composite resin with several desired performance characteristics such as tensile strength, hardness, and/or weight. Examples of fillers include carbon black, white carbon, silica, zirconium silicate, alumina, hydrated alumina, aluminum trihydrate, hydrated magnesium, barium sulfate, barium titanate, titanium oxide, antimony trioxide, magnesium oxide, molybdenum oxide, tin oxide, zinc oxide, talc, mica, glass beads, hollow glass balls, clay, silicone oil, quartz, barium carbonate, calcium carbonate, and/or magnesium carbonate.

The average particle diameter of inorganic fillers can be about 0.008 µm or more, but is typically less than 2 µm. In some embodiments, the diameter is about 0.01 µm or more, but less than about 1.5 µm, or 0.02 µm or more, but less than 1µm.

Each filler is optional, but when present, each can be included in about 0.1 to 30 parts by weight, or about 1 to 15 parts by weight, to 100 parts by weight of the total resin component. In some embodiments, more than one type of filler can be included in the HF flame retardant resin composition. In some embodiments, about 0.5 to 5 parts by weight of each optional filler is included in the resin composition.

Flame Retardant Additives.

The flame retardant additives described below, when combined with a resin, can result in significantly lower toxicity as flame retardants compared to halogen-containing flame retardants, such as chlorine and bromine containing compositions. The flame retardant additives can interfere with the burning process by promoting various physical processes. Such processes can include the release of water or non-flammable gases, which dilute the gases feeding flames; absorption of heat energy (in these gas-release reactions), thus cooling the fire; and/or production of a non-flammable and resistant layer on the surface of material. Such decomposition reactions can act to form a glassy protective layer on the material's surface, and/or release of an acid that can cause charring of the material, thereby reducing the release of flammable gasses.

These additives can be used in relatively large concentrations, and/or in combination with other types of flame retardants. Specific applications of these additives, for example, within organic coatings, can enable high concentrations to be added to resins without modifying their performance properties.

The flame retardant resin compositions described herein include one or more flame retardant additives described below. The flame retardant additive can be a nitrite, a nitride, a borate, a silicide, a silicate, an antioxidant compound, and/or combinations thereof. Examples of nitrides include alkali metal nitrides and alkaline earth nitride. Examples of borates include alkali metal borates and alkaline earth borates. Examples of silicides include alkali metal silicides and alkaline earth silicides. Examples of silicates include alkali metal silicates and alkaline earth silicates. Examples of antioxidants include compounds such as amino acids (e.g., glutathione) and alkali or alkaline earth salts thereof, polyphenols, carotenoids, tocotrienols, ascorbic acid and alkali or alkaline earth salts thereof, lipoic acid and alkali or alkaline earth salts thereof; and/or combinations thereof.

Nitrites. Nitrites ($NO_2^-$) can be used as flame retardant additives by incorporating the nitrites into a resin. When exposed to sufficient heat, nitrite infused resins can decompose to release nitrous oxide (a non-flammable gas). Alkali metal ions or alkaline earth metal ions can scavenge negatively-charged high energy ions. Examples of nitrites that can be used as flame retardant additives include the alkali metal nitrites, such as lithium nitrite ($LiNO_2$), sodium nitrite ($NaNO_2$), and potassium nitrite ($KNO_2$), and the alkaline earth metal nitrites, such as magnesium nitrite ($Mg(NO_2)_2$) and calcium nitrite ($Ca(NO_2)_2$).

Nitrides. Nitrides can act as flame retardant additives when combined with a polymer or resin. For example, lithium nitride and the alkaline earth nitrides deprotonate hydrogen gas, and are rapidly hydrolyzed by water to form ammonia. Examples of nitrides that can be used as flame retardant additives include the alkali metal nitrides, such as lithium nitride ($Li_3N$), and the alkaline earth metal nitrides, such as magnesium nitride ($Mg_3N_2$), beryllium nitride ($Be_3N_2$), and calcium nitride ($Ca_3N_2$).

Lithium nitride is readily formed and can be obtained commercially. $Na_3N$ and $K_3N$ have been synthesized by simultaneously depositing metal atoms and nitrogen atoms onto a liquid nitrogen cooled sapphire substrate. Both $Na_3N$ and $K_3N$ are considered unstable compounds.

Borides and Borates. Borides and/or borates can act as flame retardant additives when combined with a polymer or resin. The flame retardant action of the boride or borate is similar nitrides and nitrites. A negatively-charged boride or borate species results upon decomposition to yield a far less toxic acid after it scavenges high energy proton ions, in comparison to halogenated flame retardants. For example, upon heating near the surface of a solid resin material, the boron containing compounds can form an acid, such as boric acid, which chars carbon compounds at the surface of the resin material, causing gaseous bubbles to form, which then harden within the charred surface of the resin, producing a fire-resistant barrier on the surface.

Examples of borates that can be used as flame retardant additives include the alkali metal borates, such as sodium metaborate ($NaBO_2$), sodium tetraborate ($Na_2B_4O_7$), and $NaB_{14.5}$ or $Na_2B_{29}$ (also known as $NaB_{15}$), and the alkaline earth metal borates, such as calcium aluminum triborate ($CaAlB_3O_7$; johachidolite), and the inexpensive magnesium diboride ($MgB_2$).

A number of polymeric borate ions are known in anhydrous compounds, which are made by reacting $B(OH)_3$ or $B_2O_3$ with metal oxides. Examples include diborate ($B_2O_5^{4-}$), e.g., in $Mg_2B_2O_5$ (suanite); triborate ($B_3O_7^{5-}$), e.g., in $CaAlB_3O_7$ (johachidolite); tetraborate ($B_4O_9^{6-}$), e.g., in e.g. $Li_6B_4O_9$; and metaborates containing the linear $[BO_2^-]_n$ with three coordinate boron, such as in $LiBO_2$ or $CaB_2O_4$. Common borate salts include sodium metaborate ($NaBO_2$), and sodium tetraborate ($Na_2B_4O_7$), which is usually encountered as borax, the so-called decahydrate, and actually contains the hydroxoborate ion, $B_4O_5(OH)_4^{2-}$ and is often formulated $Na_2[B_4O_5(OH)_4].8H_2O$. Various other known forms of borate can be used as flame retardant additives, such as disodium octaborate tetrahydrate.

Silicides. Silicides are compounds that have silicon bonded to more electropositive elements. Silicides are structurally closer to borides than to carbides. The chemical bonds in silicides range from conductive metal-like structures to covalent or ionic. Silicides of all non-transition metals, with exception of beryllium, have been described.

Examples of silicides include the electrically nonconductive magnesium silicide ($Mg_2Si$) and calcium silicide ($Ca_2Si$), and $Si_4$ tetrahedra such as $K_4Si$, $Rb_4Si$, and $Cs_4Si$. Silicides can also be in the form of $Si_n$ chains, such as CaSi chains, and corrugated hexagonal Si layers, for example, $CaSi_2$. Group 1 and 2 silicides, e.g., $Na_2Si$ and $Ca_2Si$, react with water to yield hydrogen and/or silanes. Additional examples of alkali metal silicides and alkaline earth metal silicides include sodium silicide (NaSi) and magnesium silicide. Magnesium silicide is dark blue or slightly purple in color. Silicon dioxide forms magnesium silicide when heated with magnesium. Magnesium silicide can also be formed by a reaction between magnesium hydride and silicon with the evolution of hydrogen gas at temperatures above 250° C.

Silicates. Silicate are compounds containing ions in which one or more central silicon atoms are surrounded by electronegative ligands. Silicate species most often are silicon with oxygen as the ligand. Silica, or silicon dioxide, $SiO_2$, can be considered a silicate, although it is the special case with no negative charge and no need for counter-ions. Silica is found in nature as the mineral quartz, and its polymorphs. Silicon may adopt octahedral coordination by 6 oxygens, for example, in the hexahydroxysilicate anion, $[Si(OH)_6]^{2-}$, as found in the mineral thaumasite $(Ca_3Si(CO_3)(SO_4)(OH)_6 \cdot 12(H_2O))$.

Other examples of silicates include alkali metal silicates and alkaline earth metal silicates, such as the metals in combination with silicate ions, such as nesosilicates ($[SiO_4]^{4-}$), e.g., olivine; sorosilicates ($[Si_2O_7]^{6-}$), e.g., epidote; cyclosilicates ($[Si_nO_{3n}]^{2n-}$), e.g., the tourmaline group; inosilicates ($[Si_nO_{3n}]^{2n-}$), e.g., the pyroxene group; inosilicates ($[Si_{4n}O_{11n}]^{6n-}$), e.g., the amphibole group; phyllosilicates ($[Si_{2n}O_{5n}]^{2n-}$), e.g., micas and clays; and tectosilicates ($[Al_xSi_yO_{2(x+y)}]^{x-}$), e.g., quartz, feldspars, and/or zeolites. Tectosilicates can have additional cations when some of the silicon is replaced by a lower-charge cation such as aluminum. This substitution can also take place in other types of silicates.

Synthetic silicates also can be used in the flame retardant compositions described herein. Some are called "hydrated silicic acid" or "wet silica". The synthetic silicate can have any crystalline structure, including somewhat random networks of Si—O, commonly referred to as "amorphous silica". The synthetic silicate is typically 40% to 70% by weight $SiO_2$, and 5% to 45% by weight each of MgO and/or CaO as secondary components. In one embodiment, a synthetic silicate containing 50% to 60% by weight of $SiO_2$ and 12% to 30% by weight of a combination of MgO and CaO, and having an ignition loss of 10 to 30% by weight is used.

Silicides and/or silicates act similarly to nitrites, with the additional ability of any remaining silicon oxide compound in the resin that has not been released for high energy ion scavenging to form a vitreous substance that can shield the resin from further flame exposure.

Antioxidants. Incorporation of antioxidant compounds such as amino acids (e.g., glutathione), polyphenols, carotenoids, tocotrienols, ascorbic acid, and/or lipoic acid, into resins can scavenge high energy ions that may be released by burning the resin. The antioxidants can be included in a resin alone, or in combination with other flame retardant additives described above.

Hydrates of the inorganic additives described above can also be employed in resins. In the presence of heat, the hydrates can decompose to release water. The water, as steam, can form a layer of non-flammable gas near a material's surface, thereby inhibiting flame formation. The reaction to release water and/or decomposition of the additive compound can be endothermic, thereby cooling the material and slowing the burning process.

The amount of the flame retardant additive used in a resin composition can be about 10 to about 300 parts by weight, for example, 100 to 250 parts by weight, to 100 parts by weight of the total resin component of the composition. Amounts within the aforementioned ranges, at increments of 5 parts by weight, can also be used, with respect to 100 parts by weight of the total resin component of the composition.

Optional Additives.

Although the composition can include a resin, such as a thermoplastic synthetic resin, and a flame retardant additive as described above, the flame retardant resin composition may also include additional optional components. Inorganic flame retardants, other than the flame retardant additives described above, can optionally be added to resins to provide additional variations of the flame retardant resins described herein. Examples of such inorganic flame retardants include aluminum hydroxide, magnesium hydroxide, calcium hydroxide, or a combination thereof, where the particles have an average size (diameter) of about 0.1 to about 10 μm. Such inorganic compounds may be added in an amount of 1% to 50% by weight, based on the total weight of the composition, to impart flame resistant effects to the resin. For example, aluminum hydroxide, magnesium hydroxide, calcium hydroxide, or a combination thereof, can be included in about 1%, about 2%, about 5%, about 10%, about 15%, about 20%, about 30%, about 40%, or about 50% by weight, based on the total weight of the composition.

Other useful halogen-free fire retardant optional additives include melamine cyanurate, phosphoric acid, 1,3-phenylenetetraphenyl ester, di-polyoxy-ethylene, hydroxymethylphosphonate, and mixtures thereof. The particle size of optional additives such as melamine cyanurate can range from about 1 to about 20 microns. Typical melamine cyanurate particle sizes are less than about 12 microns. Melamine cyanurate particle sizes of less than 4 microns can help minimize surface defects and resin wet-out problems.

Other optional components include lubricants such as mineral oil or paraffin oil, to enhance the stability of the composition, for example, during processing. The composition may include a titanate or silane coupling agent to enhance the adhesion of a filler to the resin matrix. The composition may also contain an organic or inorganic pigment or dye, such as carbon black, an azo type pigment, cyanine blue, cyanine green, iron oxide red, or titanium oxide, to add various colors to the resin composition.

Yet other optional additives include antimony compounds such as antimony pentoxide, and sodium antimonite; inorganic compounds such as zinc borate, guanidine sulfamate, zirconium salts, molybdenum salts, aluminum borate, and tin compounds; organometallic compounds such as ferrocene; and phosphorus-containing compounds such as phosphates, aromatic-condensed phosphates, phosphazene compounds, phosphorus-containing epoxy compounds, reactive phosphorus compounds, ammonium polyphosphate, melamine phosphate, melamine salts of polyphosphoric acid, melam salts of polyphosphoric acid, melem salts of polyphosphoric acid, complex melamine-melam-melem salts of polyphosphoric acid, red phosphorus, and phosphazene compounds. Such components can promoting and/or provide heat resistance, moisture resistance, and flame retardance.

Each optional additive, when present, can be included in about 0.1 to 15 parts by weight, to 100 parts by weight of the total resin component. In some embodiments, more than one optional additive, e.g., 2, 3, 4, or 5 optional additives, can be included in the HF flame retardant resin composition. In some embodiments, about 0.5 to 5 parts by weight of each additional optional additive is included in the resin composition.

The resin composition can optionally exclude certain ingredients, such as one or more optional additives described above, such as phosphorus or phosphorus containing compounds. The combination of certain flame retardant additives and optional additives, in combination with the exclusion of other optional additives can provide a composition with excellent mechanical characteristics, fire retardancy, heat resistance, and flexibility, which also exudes no harmful heavy metal compounds, nor does it produces a large amount of smoke or corrosive gases when buried or burned.

Preparation of Flame Retardant Resin Compositions.

Halogen-free fire-retardant materials secure their fire-retardancy by mixing a halogen-free fire-retardant additive in a resin. The halogen-free flame retardant synthetic resin composition can be prepared by using a master batch that includes a polymer, such as a thermoplastic synthetic resin, a flame retardant additive as described herein, and other optional additives, or by mixing these components each in such an amount so as to provide its end-use concentration, followed by kneading the resulting mixture by ordinary means, such as using a single-screw type extruder, twin-screw type extruder, roll mill, or Banbury mixer. Flame retardant additives, such as borates, nitrides, silicides, and/or silicates, may be preliminarily added to the other components prior to, during, or after mixing the resin and other optional components.

In some embodiments, one or more flame retardant additives as described herein can be either simply mixed into plastics and then held in the material when the plastic sets, or when reactive to the plastic or optionally added crosslinking agents, the flame retardant additive can chemically bind into the plastic molecules at polymerization. A selection between simply mixing and chemically binding can depend on the properties desired or required of the flame retardant resin composition, in terms of finished product performance, means of processing (e.g., melting, extrusion, and/or molding), and flame retardancy characteristics (e.g., temperature of onset of the charring process).

Evaluation of the composition can be carried out by standard polymer analysis techniques. For example, when a thermoplastic resin other than polystyrene or ABS is used, the resin, a flame retardant additive, and other additives can be mixed and the obtained mixture can be kneaded in a 75 liter Banbury mixer. The mixture can be processed with a mixing roll to obtain a sheet having a thickness of about 3 mm. This sheet can be reprocessed with a rectangular pelletizer to provide a rectangular pellet having a length of each side of about 3 mm. The HF flame retardant resin composition can also be provided in the form of a film or a sheet. The thickness of the film or sheet can be about 1 to 150 µm, or about 3 to 100 µm, for example, about 5 to 80 µm.

This rectangular pellet can be repelletized with a vent type 70 Phi extruder at 150° C. to provide a cylindrical pellet. This cylindrical pellet can be used as a sample for analysis, or it can be combined with other pellets to parts, components, or other forms for various electronic applications. The cylindrical pellet can be examined for oxygen index, for example, according to JIS K-7201. The pellet can also be molded into a sheet having a thickness of 200 µm with a T-die sheet molding machine to determine the combustion rate of the sheet with a flammability tester, for example, according to FMVSS-302 standards.

When polystyrene or ABS is used as a thermoplastic synthetic resin, the resulting composition can be molded with an injection machine of about 3.5 ounces into a test bar, for example, according to the vertical flame test of UL-94. The test bar can be further molded into a test piece having a thickness of approximately ⅛ inch. This test piece can be used as a sample for the vertical flame test.

The processability of the resin compositions described herein can be evaluated by subjecting samples of the blend to shaping operations such as injection molding or compression molding. For satisfactory injection molding, the material should form in the mold a homogeneous article of uniform strength. The flow viscosity characteristics of such blends are adequate to insure filling the mold properly under the operating conditions. In processing the resin, a lubricant can be included, for example, to improve the molding quality of the resin composition. In some embodiments, the lubricant can be Akzo Armeen® 18D surfactant or Vanfre® Vam processing aid. Any known lubricant conventionally used in plastics processing can also be used. A lubricant can be used in amounts varying from about 0.1-3 parts by weight per 100 parts of the resin. In one embodiment, about 0.5-1 part by weight per 100 parts of the resin can be used.

In the single step operation, the resin or resins, the flame retardant additive, a filler and optionally other ingredients can be charged at the desired ratio to a Farrell Continuous Mixer (FCM), a transfer type extruder-mixer that allows efficient mastication of the blend at a desired temperature. The blending apparatus can be pretreated to reduce the time necessary to reach the processing temperature range. The same operation can also be run in a Banbury-type mixer.

The blend is then held at the processing temperature while continuing the mixing. During processing, a stabilizer system can be contacted with the blend and processing can be continued for a short time, usually for about one minute or more, in order to thoroughly incorporate the stabilizer in the blend.

In a multi-step process, the resin or resins and the flame retardant additive can be charged to a suitable apparatus wherein flame retardant additive masterbatching takes place. Thereafter, the flame retardant masterbatch can be blended with the resins at desirable ratios, optionally with other components, as desired for the specific composition.

A method for forming a non-halogen flame retardant resin composition includes preblending the components. One-half of the total amount of resin, such as polypropylene, can be placed in an accurate loss and weigh feeder preblender. Pre-weighed ingredients other than the resin can be added to the preblender, one-half of each ingredient to each side of the blender. The preblender can be turned on and the resin is mixed for about five minutes. Thereafter, the remainder of the resin is added to the preblender and mixed for about an additional ten minutes to thoroughly mix the resin and flame-retardant additive system.

An extruder resin system can be pelletized or can conduct other processing as necessary. If pelletizing is carried out, a pelletizer, such as a pelletizer commercially available from Conair, Inc., can be set to, for example, about 44 rpm to form pellets that have a diameter of, for example, about 0.03125 to about 0.0625 inches (0.079 and 0.16 cm). Hot, dry air can be blown over the pellets prior to packaging to minimize water contact and absorption.

The flame retardant resin composition can be reheated to a temperature of about 410° F. (about 210° C.) for molding various components such as casings or other suitable structures. The thickness of casings can be, for example, about 0.03125 to about 0.125 inches (0.079 and 0.32 cm).

Devices and Apparatuses.

The flame retardant materials described herein can be used in devices and apparatuses that include plastic materials, especially those that include electrical components or require flame resistance. Examples include molded parts, wire coatings, circuit board substrates, or parts for cellular phones, PDAs (portable information terminals), mobile videophones, personal computers, electronic notebooks, servers, routers, LCD projectors, engineering workstations (EWS), pagers, word processors, televisions, video recorders, calculators, a car navigation systems, POS terminals, or touch panel-equipped devices. The flame retardant materials can also be used as coverings or coatings for materials such as wiring materials, electric cables, optical fibers, and the like.

The resulting composite resin molded articles can have excellent flame retardancy, electric insulation properties, and crack resistance, and can generate only a very small amount of toxic substances during incineration. Laminate and multilayer circuit boards can have a low thermal expansion and a high modulus of elasticity.

Figure 1:
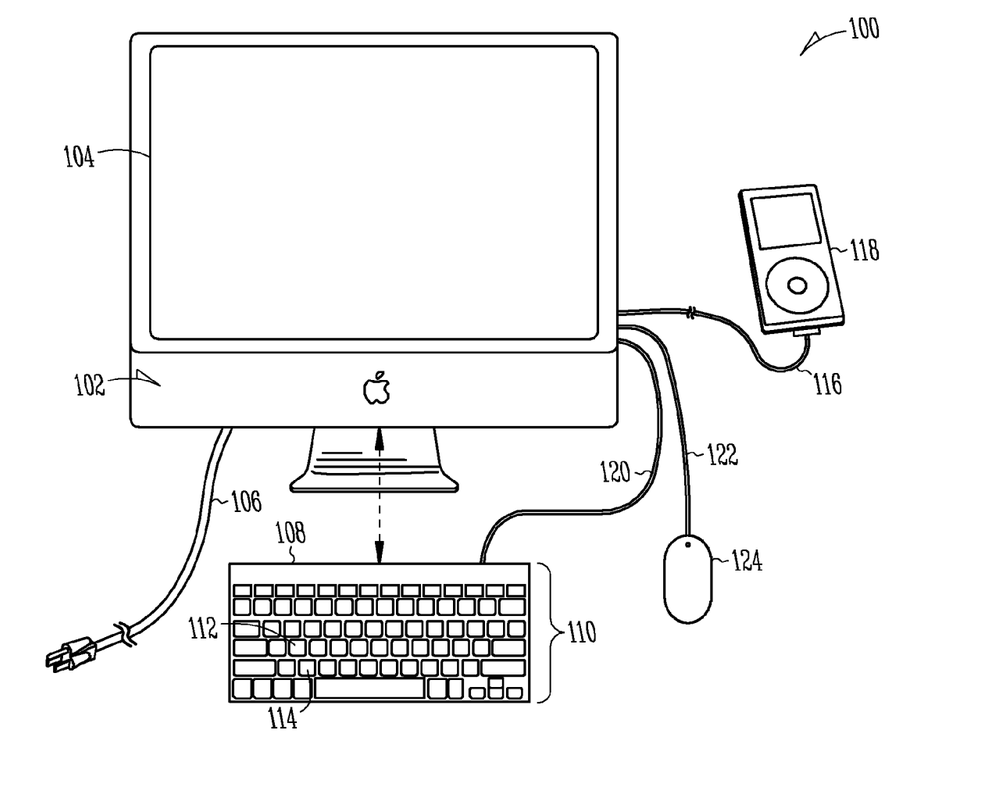
FIG. 1 illustrates an example computing system of a type that can include parts made of, and that can benefit from use of, a halogen free resin composition as described herein, in one illustrative operating configuration.

FIG. 1 illustrates a representation of computing system 100 including an input device in the form of a keyboard 108, a device 118 that can provide input to the computing system or store information such as an external hard drive, phone, or similar device, and a mouse 124. For the purposes of this specification, the term "computing system" includes a system that uses one or more processors, microcontrollers and/or digital signal processors and that has the capability of running a "program." As used herein, the term "program" refers to a set of executable machine code instructions, and as used herein, includes user-level applications as well as system-directed applications or daemons, including operating system and driver applications. Computing systems include communication and electronic devices, such as mobile phones (cellular or digital), music and multi-media players, and Personal Digital Assistants (PDA); as well as computers, or "computing devices" of all forms (desktops, tablets, laptops, servers, palmtops, workstations, etc.); and further include the peripheral devices that are used to control and interface with the remainder of the computing system.

Many configurations of peripheral components can be employed with such computing systems, as will be recognized by those skilled in the art. Keyboard 108 can be of a configuration well-known in the industry, having plastic keys and often additional components formed of plastics, including attachment cables and port connectors. As will be apparent to one of skill in the art, the methods and apparatus described are applicable both to much simpler and to more complicated devices and computing systems. Any component that includes plastic or a resin can include a flame retardant resin composition as described herein.

In some embodiments, the input device can be a mouse, a touch screen, a keypad of a mobile communications device, or another type of input interface, etc. Keyboard 108 can includes a plurality of keys (e.g., 112 and 114 configured to detect user inputs, and to communicate those user inputs to computing device 102 through a wired (or in some cases, a wireless) connection 120. Mouse 124 can be configured to detect user inputs, and to communicate those user inputs to computing device 102 through a wired (or, again, in some cases, a wireless) connection 122. Device 118 can be configured to detect user inputs or to allow for access of stored information, and to communicate those user inputs or the information to computing device 102 through a wired connection 116. The input can be communicated to the user via monitor 104. Computing device 102 can receive power through a power connection cord 106.

The following Examples are intended to illustrate the above invention and should not be construed as to narrow its scope. One skilled in the art will readily recognize that the Examples suggest many other ways in which the invention could be practiced. It should be understood that numerous variations and modifications may be made while remaining within the scope of the invention. The recited amounts are parts by weight, unless otherwise indicated.

EXAMPLES

Example 1

Flame-Retardant Resin Compositions

The flame retardant additive can be an alkali or alkaline earth nitride; an alkali or alkaline earth nitrite; an alkali or alkaline earth borate; an alkali or alkaline earth silicide; an alkali and alkaline earth silicate; or an antioxidant compound. For example, the flame retardant additive can be one or more of the following additives.

Nitrites. The nitrite flame retardant can be lithium nitrite ($LiNO_2$), sodium nitrite ($NaNO_2$), potassium nitrite ($KNO_2$), magnesium nitrite ($Mg(NO_2)_2$), or calcium nitrite ($Ca(NO_2)_2$).

Nitrides. The nitride flame retardant can be lithium nitride, magnesium nitride ($Mg_3N_2$), beryllium nitride ($Be_3N_2$), or calcium nitride ($Ca_3N_2$).

Borides and Borates. The boride or borate flame retardant can be sodium metaborate ($NaBO_2$), sodium tetraborate ($Na_2B_4O_7$), $NaB_{14.5}$, $Na_2B_{29}NaB_{15}$, calcium aluminum triborate ($CaAlB_3O_7$; johachidolite), magnesium diboride ($MgB_2$), $Mg_2B_2O_5$ (suanite); $CaAlB_3O_7$ (johachidolite); $Li_6B_4O_9$; $LiBO_2$, $CaB_2O_4$, sodium metaborate ($NaBO_2$), sodium tetraborate ($Na_2B_4O_7$), $Na_2[B_4O_5(OH)_4].8H_2O$, or disodium octaborate tetrahydrate.

Silicides. The silicide flame retardant can be $Mg_2Si$, $Ca_2Si$, $K_4Si$, $Rb_4Si$, $Cs_4Si$, $CaSi_2$, $Na_2Si$, $Ca_2Si$, sodium silicide ($Na_2Si$), or magnesium silicide ($Mg_2Si$).

Silicates. The silicate flame retardant can be silica, silicon dioxide ($SiO_2$), thaumasite ($Ca_3Si(CO_3)(SO_4)(OH)_6.12(H_2O)$), olivine; or epidote.

Antioxidants. The antioxidant flame retardant can be glutathione, vitamin A, vitamin E, ascorbic acid, or lipoic acid.

| | |
|---|---:|
| synthetic resin | 50-100 parts |
| filler | 20-150 parts |
| flame retardant additive | 25-250 parts |
| pigment | 3-30 parts |
| Total | 98-530 parts |

The components of Example 1 may be present at any 5 part increment from end point to end point of the recited ranges. In some embodiments, the filler and/or pigment components can be omitted entirely.

Examples 2-27

Flame-Retardant Resin Compositions

For examples 2-27, the flame retardant additive can be an alkali or alkaline earth nitride; an alkali or alkaline earth nitrite; an alkali or alkaline earth borate; an alkali or alkaline earth silicide; an alkali and alkaline earth silicate; or an antioxidant compound, as described for Example 1.

Example 2

| | |
|---|---:|
| low-density polyethylene (e.g., YUKARON HE-30 mfd. by Mitsubishi Petrochemical Co., Ltd., MI: 0.3) | 60 parts |
| flame retardant additive | 40 parts |
| synthetic calcium silicate (e.g., SILMOS-T mfd. by Shiraishi Industrial Co., Ltd., $SiO_2$ content: 60%) | 3 parts |
| Total | 103 parts |

Example 3

| | |
|---|---:|
| low-density polyethylene (same component as in Example 2) | 55 parts |
| flame retardant additive | 45 parts |
| synthetic calcium silicate (same component as in Example 2) | 3 parts |
| Total | 103 parts |

Example 4

| | |
|---|---:|
| low-density polyethylene (same component as in Example 2) | 50 parts |
| flame retardant additive | 50 parts |
| synthetic calcium silicate (same component as in Example 2) | 1.5 parts |
| Total | 101.5 parts |

Example 5

| | |
|---|---:|
| low-density polyethylene (same component as in Example 2) | 50 parts |
| flame retardant additive | 50 parts |
| synthetic calcium silicate (same component as in Example 2) | 3 parts |
| Total | 103 parts |

Example 6

| | |
|---|---:|
| straight-chain low-density polyethylene (e.g., ULTZEX 3520F mfd. by Mitsui Petrochemical Industries, Ltd. MI: 2.1) | 50 parts |
| flame retardant additive | 50 parts |
| synthetic silicate (same component as in Example 2) | 3 parts |
| Total | 103 parts |

Example 7

| | |
|---|---:|
| high-density polyethylene (HIZEX 3300F mfd. by Mitsui Petrochemical Industries, Ltd., MI: 0.9) | 50 parts |
| flame retardant additive | 50 parts |
| synthetic calcium silicate (e.g., SOLEX CM mfd. by Tokuyama Soda Co., Ltd., SiO$_2$ content: 57%) | 3.0 parts |
| Total | 103 parts |

Example 8

| | |
|---|---:|
| ethylene-vinyl acetate copolymer (Evatate H 1011 mfd. by Sumitomo Chemical Co., Ltd., vinyl acetate content: 15%) | 50 parts |
| flame retardant additive | 50 parts |
| synthetic calcium silicate (SOLEX CM, the same as in Example 7) | 3 parts |
| Total | 103 parts |

Example 9

| | |
|---|---:|
| polypropylene (e.g., JHG mfd. by Mitsui Toatsu Chemicals, Inc., MI: 4.0) | 50 parts |
| flame retardant additive | 50 parts |
| synthetic calcium silicate (SOLEX CM, the same as in Example 7) | 3 parts |
| Total | 103 parts |

Example 10

| | |
|---|---:|
| low-density polyethylene (YUKARON HZ-30, same as that in Example 2) | 50 parts |
| flame retardant additive | 50 parts |
| synthetic calcium silicate (SOLEX CM, same as in Example 7) | 3 parts |
| Total | 103 parts |

Example 11

| | |
|---|---:|
| low-density polyethylene (same component as in Example 2) | 50 parts |
| flame retardant additive | 50 parts |
| synthetic calcium silicate (same component as in Example 2) | 7 parts |
| Total | 107 parts |

Example 12

| | |
|---|---:|
| low-density polyethylene (same component as in Example 2) | 50 parts |
| flame retardant additive | 50 parts |
| synthetic calcium silicate (same component as in Example 2) | 10 parts |
| Total | 110 parts |

Example 13

| | |
|---|---:|
| polystyrene (e.g., STYRON 470 mfd. by Asahi Chemical Industry Co., Ltd, MI: 4.0) | 50 parts |
| flame retardant additive | 50 parts |
| synthetic calcium silicate (SILMOS-T, same as in Example 2) | 3 parts |
| Total | 103 parts |

Example 14

| | |
|---|---:|
| ABS (e.g., DENKA OF mfd. by Denki Kagaku Kogyo K.K.) | 50 parts |
| flame retardant additive | 50 parts |
| synthetic calcium silicate (SILMOS-T, same as in Example 2) | 3 parts |
| Total | 103 parts |

Example 15

| | |
|---|---:|
| low-density polyethylene (e.g., YUKARON HE-30 mfd. by Mitsubishi Petrochemical Co., Ltd., MI: 0.3) | 60 parts |
| magnesium hydroxide (e.g., KISUMA 5B mfd. by Kyowa Chemicals Co., Ltd., average particle size: 0.8 μm) | 40 parts |
| synthetic calcium silicate (e.g., SILMOS-T mfd. by Shiraishi Industrial Co., Ltd., SiO$_2$ content: 60%) | 3 parts |
| flame retardant additive | 30 parts |
| Total | 103 parts |

Example 16

| | |
|---|---:|
| low-density polyethylene (same component as in Example 2) | 55 parts |
| magnesium hydroxide (same component as in Example 15) | 45 parts |
| synthetic calcium silicate (same component as in Example 2) | 3 parts |
| flame retardant additive | 30 parts |
| flame retardant additive | 30 parts |
| Total | 103 parts |

Example 17

| | |
|---|---:|
| low-density polyethylene (same component as in Example 2) | 50 parts |
| magnesium hydroxide (same component as in Example 15) | 50 parts |
| synthetic calcium silicate (same component as in Example 2) | 1.5 parts |
| flame retardant additive | 30 parts |
| Total | 101.5 parts |

Example 18

| | |
|---|---:|
| low-density polyethylene (same component as in Example 2) | 50 parts |
| magnesium hydroxide (same component as in Example 15) | 50 parts |
| synthetic calcium silicate (same component as in Example 2) | 3 parts |
| flame retardant additive | 30 parts |
| Total | 103 parts |

Example 19

| | |
|---|---:|
| straight-chain low-density polyethylene (e.g., ULTZEX 3520F mfd. by Mitsui Petrochemical Industries, Ltd. MI: 2.1) | 50 parts |
| magnesium hydroxide (same component as in Example 15) | 50 parts |
| synthetic silicate (same component as in Example 2) | 3 parts |
| flame retardant additive | 30 parts |
| Total | 103 parts |

Example 20

| | |
|---|---:|
| high-density polyethylene (HIZEX 3300F mfd. by Mitsui Petrochemical Industries, Ltd., MI: 0.9) | 50 parts |
| magnesium hydroxide (same component as in Example 15) | 50 parts |
| synthetic calcium silicate (e.g., SOLEX CM mfd. by 3.0 parts Tokuyama Soda Co., Ltd., SiO$_2$ content: 57%) | 3 parts |
| flame retardant additive | 30 parts |
| Total | 103 parts |

Example 21

| | |
|---|---:|
| ethylene-vinyl acetate copolymer (Evatate H 1011 mfd. by Sumitomo Chemical Co., Ltd., vinyl acetate content: 15%) | 50 parts |
| magnesium hydroxide (same component as in Example 15) | 50 parts |
| synthetic calcium silicate (SOLEX CM, the same as in Example 7) | 3 parts |
| flame retardant additive | 30 parts |
| Total | 103 parts |

Example 22

| | |
|---|---:|
| polypropylene (e.g., JHG mfd. by Mitsui Toatsu Chemicals, Inc., MI: 4.0) | 50 parts |
| magnesium hydroxide (same component as in Example 15) | 50 parts |
| synthetic calcium silicate (SOLEX CM, the same as in Example 7) | 3 parts |
| flame retardant additive | 30 parts |
| Total | 103 parts |

Example 23

| | |
|---|---:|
| low-density polyethylene (YUKARON HZ-30, same as that in Example 2) | 50 parts |
| aluminum hydroxide (HIGILITE H-42M mfd. by Showa Light Metal Co., Ltd., average particle size: 0.8 μm) | 50 parts |
| synthetic calcium silicate (SOLEX CM, same as in Example 7) | 3 parts |
| flame retardant additive | 30 parts |
| Total | 103 parts |

Example 24

| | |
|---|---:|
| low-density polyethylene (same component as in Example 2) | 50 parts |
| magnesium hydroxide (same component as in Example 15) | 50 parts |
| synthetic calcium silicate (same component as in Example 2) | 7 parts |
| flame retardant additive | 30 parts |
| Total | 107 parts |

Example 25

| | |
|---|---:|
| low-density polyethylene (same component as in Example 2) | 50 parts |
| aluminum hydroxide (e.g., HIGILITE H-42M mfd. by Showa Light Metal Co., Ltd., average particle size of 0.8 μm) | 50 parts |
| synthetic calcium silicate (same component as in Example 2) | 10 parts |
| flame retardant additive | 30 parts |
| Total | 110 parts |

Example 26

| | |
|---|---:|
| polystyrene (e.g., STYRON 470 mfd. by Asahi Chemical Industry Co., Ltd, MI: 4.0) | 50 parts |
| magnesium hydroxide (KISUMA 5B, the same as in Example 15) | 50 parts |

-continued

| | |
|---|---|
| synthetic calcium silicate (SILMOS-T, same as in Example 2) | 3 parts |
| flame retardant additive | 30 parts |
| Total | 103 parts |

Example 27

| | |
|---|---|
| ABS (e.g., DENKA OF mfd. by Denki Kagaku Kogyo K.K.) | 50 parts |
| magnesium hydroxide (KISUMA 5B, the same as in Example 15) | 50 parts |
| synthetic calcium silicate (SILMOS-T, same as in Example 2) | 3 parts |
| flame retardant additive | 30 parts |
| Total | 103 parts |

In each of Examples 1-27, a second flame retardant additive can be added at an amount of about 5 parts to about 300 parts, or at any 5 part increment in between. A second filler or a third retardant additive of about 1.5 parts to about 40 parts each can also be added. Each Example may also include 1-30 parts of a dye or pigment component.

Examples 28-34

Flame-Retardant Resin Compositions and Molded Parts

| | Example | | | | | | |
|---|---|---|---|---|---|---|---|
| | 28 | 29 | 30 | 31 | 32 | 33 | 34 |
| Block copolymer | 100 | 100 | 100 | 100 | 100 | 100 | 100 |
| Paraffin oil | 40 | 76 | 15 | 90 | 40 | 70 | 40 |
| Ethylene-α-olefin copolymer | 133 | 81 | 80 | 60 | 100 | 370 | 133 |
| Block polypropylene | 33 | | | | | 30 | 33 |
| Random polypropylene | | | 10 | 10 | 180 | | |
| Peroxide | 0.66 | 0.54 | 0.4 | 0.52 | 0.9 | 1.23 | 0.66 |
| Crosslinking aid | 2 | 1.6 | 1.2 | 1.56 | 2.7 | 3.7 | 2 |
| Maleic acid-modified LLDPE | 27 | 21 | 16 | 21 | 33 | 46 | 27 |
| Flame retardant additive | 500 | 405 | 331 | 421 | 680 | 924 | 233 |
| Antioxidant (optional) | 3 | 2.5 | 2.2 | 2.8 | 4.5 | 6.1 | 3 |
| Lubricant | 6 | 5 | 4.4 | 5.6 | 9.0 | 12.2 | 6 |

The block copolymer can be any block copolymer described herein, such as SEPS. The ethylene-α-olefin copolymer can be any ethylene-α-olefin copolymer described herein, such as LLDPE. The ethylene-α-olefin copolymer can have a density of, for example, about 0.87 g/cm³ to about 0.925 g/cm³. The peroxide can be any peroxide described herein, for example, dicumyl peroxide or 2,5-dimethyl-2,5-di(t-butylperoxy)-hexane. The crosslinking aid can be any curing agent described herein, such as trimethylene glycol dimethylacrylate. The flame retardant additive can be any flame retardant additive, for example, one recited in Example 1. The lubricant can be any lubricant described herein, such as montanoic acid-saponified ester was.

Example 35

| INGREDIENT DESIGNATION | INGREDIENT NAME | Wt. % Net Weight |
|---|---|---|
| AS0007 (BT2110) | Bistriazine Resin (Mitsubishi) | 39.1 |
| A50004 (PKHS-40) | Phenoxy resin (40% solids - M.W. @ 20,000) - Used as a flexibilizer/resin | 22.4 |
| AS0015 (EPON 1031A70) | Bis-Phenol-A epoxy resin | 1.9 |
| 9817Q (EPN 1138MAK80) | Epoxidized phenolic novolac resin | 13.4 |
| A50740 (DER 732) | Epoxy resin | 3.8 |
| Flame retardant additive as described for Example 1 | Halogen-free flame retardant | 15.3 |
| 97995 (PKHP-200) | Solid phenoxy resin (M.W. @ 20,000) | 3.1 |
| Z-6040 Silane | Surfactant | 1.0 |
| TOTALS | | 100 |

Example 36

A halogen free flame retardant resin composition can include 0.5 to 15 parts by weight of a flame retardant as described for Example 1; 70 to 30 parts by weight of a thermoplastic synthetic resin; and 30 to 70 parts by weight of an inorganic filler, such as magnesium hydroxide or aluminum hydroxide having average particle sizes of 0.1 to 10 μm.

Example 36

A halogen free flame retardant resin composition can include (a) 100 parts by weight of a block copolymer made up of at least two polymer blocks, the polymer blocks including a vinyl aromatic polymer and at least one polymer block that includes a conjugated diene polymer and/or a hydrogenated block copolymer; (b) 30 to 70 parts by weight of a nonaromatic-series softening agent for rubber, (c) 10 to 60 parts by weight of a polypropylene-series resin, (d) 50 to 200 parts by weight of an ethylene-α-olefin copolymer having a density of 0.91 g/cm³ or less; (e) 0.1 to 1.5 parts by weight of an organic peroxide; and 100 to 250 parts by weight of a flame retardant additive, wherein the flame retardant additive is one, two, three, four, or five of:

i) lithium nitrite ($LiNO_2$), sodium nitrite ($NaNO_2$), potassium nitrite ($KNO_2$), magnesium nitrite ($Mg(NO_2)_2$), or calcium nitrite ($Ca(NO_2)_2$);

ii) lithium nitride, magnesium nitride ($Mg_3N_2$), beryllium nitride ($Be_3N_2$), or calcium nitride ($Ca_3N_2$);

iii) sodium metaborate ($NaBO_2$), sodium tetraborate ($Na_2B_4O_7$), $NaB_{14.5}$, $Na_2B_{29}$, $NaB_{15}$, calcium aluminum triborate ($CaAlB_3O_7$; johachidolite), magnesium diboride ($MgB_2$), $Mg_2B_2O_5$ (suanite); $CaAlB_3O_7$ (johachidolite); $Li_6B_4O_9$; $LiBO_2$, $CaB_2O_4$, sodium metaborate ($NaBO_2$), sodium tetraborate ($Na_2B_4O_7$), $Na_2[B_4O_5(OH)_4].8H_2O$, or disodium octaborate tetrahydrate;

iv) $Mg_2Si$, $Ca_2Si$, $K_4Si$, $Rb_4Si$, $Cs_4Si$, $CaSi_2$, $Na_2Si$, $Ca_2Si$, sodium silicide ($Na_2Si$), or magnesium silicide ($Mg_2Si$);

v) silica, silicon dioxide ($SiO_2$), thaumasite ($Ca_3Si(CO_3)(SO_4)(OH)_6.12(H_2O)$), olivine; or epidote; or vi) an amino acid, vitamin A, vitamin E, ascorbic acid, or lipoic acid.

While specific embodiments have been described above with reference to the disclosed embodiments and examples, these embodiments and examples are only illustrative and do not limit the scope of the invention. Changes and modifications can be made in accordance with ordinary skill in the art without departing from the invention in its broader aspects as defined in the following claims.

All publications, patents, and patent documents are incorporated by reference herein, as though individually incorporated by reference. The invention has been described with reference to various specific and preferred embodiments and techniques. However, it should be understood that many variations and modifications may be made while remaining within the spirit and scope of the invention.

What is claimed is:

1. A halogen free resin composition comprising:
    at least one thermoplastic polymer;
    an inorganic filler; and
    a flame retardant additive, wherein the flame retardant additive comprises an alkali metal nitrite; an alkaline earth metal nitrite; or a combination thereof, where in the flame retardant additive is present in about 25 parts to 250 parts by weight of the composition, and the at least one thermoplastic polymer is 100 parts by weight.

2. The composition of claim 1 wherein the thermoplastic polymer comprises one or more of polyethylene (PE); ethylene-vinyl acetate copolymer (EVA); ethylene-ethyl acrylate copolymer (EEA); ethylene-methyl methacrylate copolymer (EMMA); polypropylene (PP); polystyrene (PS); polyacrylonitrile; acrylonitrile-butadiene-styrene copolymer (ABS); nylon-6; nylon-6,6; polycarbonate (PC); polyurethane; biaxially-oriented polyethylene terephthalate (boPET) polyester; ethylene-α-olefin copolymer; ethylene-vinyl ester copolymers; ethylene-α,β-unsaturated carboxylic acid alkyl ester copolymers; poly(acrylic acid); or polyphenylene sulphone (PPS).

3. The composition of claim 1 wherein the at least one thermoplastic polymer is present in about 30 wt. % to about 70 wt. % of the composition.

4. The composition of claim 1 wherein the inorganic filler is one or more of carbon black, white carbon, silica, zirconium silicate, alumina, hydrated alumina, aluminum trihydrate, hydrated magnesium, barium sulfate, barium titanate, titanium oxide, magnesium oxide, molybdenum oxide, tin oxide, zinc oxide, talc, mica, glass beads, hollow glass balls, clay, silicone oil, quartz, barium carbonate, calcium carbonate, or magnesium carbonate.

5. The composition of claim 1 wherein the inorganic filler is present in about 1 wt. % to about 30 wt. % of the composition.

6. The composition of claim 1 wherein the alkali metal nitrite or alkaline earth metal nitrite comprises lithium nitrite, sodium nitrite, potassium nitrite, magnesium nitrite, or calcium nitrite.

7. The composition of claim 1 further comprising an antioxidant, wherein the antioxidant comprises an amino acid, vitamin A, vitamin E, ascorbic acid, or lipoic acid.

8. The composition of claim 1 wherein composition has a melt index of 0.1 g/10 min to 10.0 g/10 min.

9. The composition of claim 1 wherein the flame retardant additive is present in about 100 parts to 250 parts by weight of the composition, and the at least one thermoplastic polymer is 100 parts by weight.

10. A computing system, input device, or computer component comprising the composition of claim 1.

11. A computing system, comprising:
    at least one component selected from the group consisting essentially of, a housing, an input device, and a cable, wherein the component comprises a halogen free resin, that includes,
    at least one thermoplastic polymer;
    an inorganic filler; and
    a flame retardant additive, wherein the flame retardant additive comprises an alkali metal nitrite; an alkaline earth metal nitrite; or a combination thereof, wherein the flame retardant additive is present is about 25 parts of 250 parts of weight of the composition, and the at least one thermoplastic polymer is 100 parts by weight.

* * * * *